Oct. 31, 1967 I. M. CROLL 3,350,180

MAGNETIC DEVICE WITH ALTERNATING LAMINA OF MAGNETIC MATERIAL AND NON-MAGNETIC METAL ON A SUBSTRATE

Filed Sept. 30, 1963

INVENTOR.
IAN M. CROLL

BY Allen A. Meyer, Jr.
ATTORNEY

United States Patent Office 3,350,180
Patented Oct. 31, 1967

3,350,180
MAGNETIC DEVICE WITH ALTERNATING LAMINA OF MAGNETIC MATERIAL AND NON-MAGNETIC METAL ON A SUBSTRATE

Ian M. Croll, Pleasantville, N.Y., assignor to International Business Machines Corporation, New York, N.Y., a corporation of New York Filed Sept. 30, 1963, Ser. No. 312,609
5 Claims. (Cl. 29—183.5)

This invention relates to a method of increasing the output of magnetic metal film devices by increasing the total thickness of the magnetic metal film and achieving a sufficiently high enough coercivity ($H_c$) such that the output of the device is not reduced by demagnetization of the film due to extraneous and/or stray magnetic fields. More specifically, the invention relates to preparing magnetic film device elements having high output and low disturb sensitivity to extraneous and/or stray magnetic fields and to magnetic recording devices which have high output which output is not reduced by the action of extraneous and/or stray magnetic fields. More particularly, this invention achieves this desired result by interleaving very thin non-magnetic conducting films between thin magnetic metal films.

For computer and other electronic applications, it is desirable to have memory elements which consist of magnetic material displaying uniaxial anisotropy whose direction of magnetization can be rapidly reversed on the application of an applied magnetic field. In the case of magnetic recording, it is desirable to have a material which will store magnetic information and will resist self-demagnetization and demagnetization due to magnetic fields from adjacent bits. For memory elements, it is desirable to use magnetically soft material (low $H_c$). For magnetic recording, it is desirable to have hard magnetic material (high $H_c$). Although it is desirable to have low $H_c$ for materials used for memory elements, too low an $H_c$ results in high disturbed sensitivity to stray magnetic fields.

For both memory element and magnetic recording purposes, it has been observed that an increase in the thickness of thin magnetic metal films results in an increase in the amount of magnetic material per se and, therefore, increases the amount of magnetic flux available to produce signal outputs. On the other hand, it has also been observed that the $H_c$ of thin magnetic metal films decreases with increasing thickness of the thin film magnetic metal. This decrease in $H_c$ results in increased susceptibility to demagnetization by exposure to disturbing magnetic fields which result from the proximity of neighboring magnetic bits and from magnetic fields due to current pulses encountered in the operation of memory arrays.

The use of laminated structures consisting of alternate layers of magnetic and non-magnetic material to impart particular mechanical properties in order to allow subsequent drawing or rolling of the laminated structure to achieve a desired end geometry is known.

Since it is the mechanical properties (such as, for example, ductility, strength, etc.) of the non-magnetic layers which are relied upon to determine the overall mechanical characteristic of the entire laminated structure, the thickness of the non-magnetic layers must be substantially greater than the thickness of the magnetic layers. The magnetic properties of a laminated structure containing thick non-magnetic layers are degraded due to eddy current effects if the non-magnetic material has a high conductivity. The use of thick non-magnetic layers is necessarily restricted therefor to non-conductors or materials of very low conductivity. In addition, the use of non-conductors or materials of very low conductivity creates fabrication problems in processes such as, for example, electroplating. The use of techniques such as pressure welding or annealing promote diffusion of material from one layer to another at the layer interface which in turn deleteriously affects magnetic properties of the overall structure. This effect can be minimized by a choice of suitable alloys, but this places additional restrictions on fabrication techniques (such as, for example, vapor deposition, etc.).

The present invention describes a method of increasing the output of magnetic metal film devices by preparing a series of alternating magnetic and conducting non-magnetic layers to form a laminated structure in such a manner that the coercivity of the laminated films is greater than that for an unlaminated film of the same total thickness and of the same magnetic material. Thus, an increase in the total thickness of magnetic material is obtained while still maintaining resistance to disturbing magnetic fields, thereby increasing the amount of magnetic flux available to produce signal output. Since the non-magnetic laminae are not used to impart particular mechanical properties, they do not have to be of substantial thickness, but need only be thick enough to prevent direct magnetic coupling between adjacent magnetic layers. Although the non-magnetic film is conductive it can be made sufficiently thin so that eddy current effects can be minimized. Such composite layered magnetic metal films having high output and low sensitivity to disturbing fields are useful for memory storage devices and for magnetic recording and storage of information for use in electronic computer mechanisms and related devices.

It is an object of the invention to prepare magnetic metal films.

It is another object of the invention to prepare a composite magnetic metal film.

It is a further object of the invention to prepare a composite magnetic metal film having an enhanced coercivity such that the output of the device is not reduced by demagnetization of the film due to disturbing extraneous or stray magnetic fields.

A further object of the invention is to increase the output of magnetic metal film and achieving a sufficiently high coercivity such that the output of the device is not reduced by demagnetization of the film due to extraneous and/or stray magnetic fields.

A still further object of the invention is a composite magnetic metal film prepared by interleaving very thin nonconducting films between thin magnetic metal films so that the composite film exhibits enhanced coercivity as compared with an unlaminated structure of the same total thickness of magnetic material.

Another still further object of the invention is the use of a laminated magnetic film structure to impart increased coercivity to a composite film structure as compared with an unlaminated structure of the same total thickness of magnetic material.

Further another object of the invention describes a method of increasing the output of magnetic metal film devices by preparing a series of alternating magnetic and conducting non-magnetic layers to form a laminated structure in such a manner that the coercivity of the laminated films is greater than that for an unlaminated film of the same total thickness of magnetic material.

Still another object of the invention is to prepare a series of alternating magnetic metal films and conducting non-magnetic layers to form a laminated structure which exhibits enhanced coercivity when compared with an unlaminated structure of the same total thickness of ferromagnetic material in which the ferromagnetic material is selected from the group consisting of cobalt, cobalt-nickel alloy, iron-nickel alloy, iron-nickel-cobalt alloy, iron-nickel-phosphorus alloy, cobalt-phosphorus alloy, cobalt-nickel-phosphorus alloy and the conducting non-magnetic material is selected from the group consisting of gold, silver, copper, tin, platinum, rhodium, palladium, etc.

The foregoing and other objects, features and advantages of the invention will be apparent from the following more particular description of preferred embodiments of the invention, as illustrated in the accompanying drawings.

Figure 1:
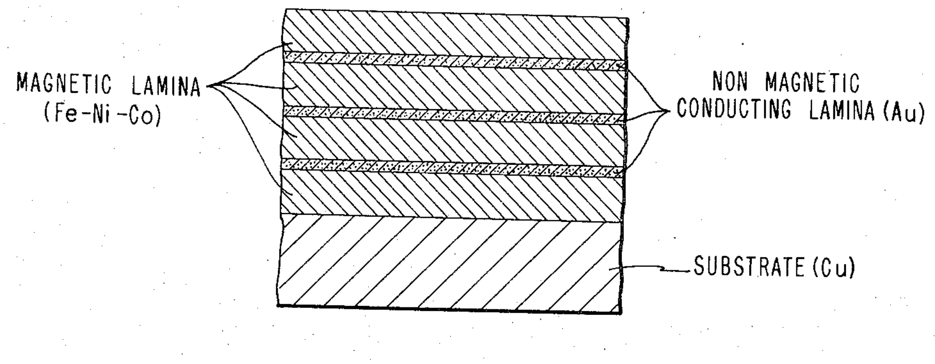
FIG. 1 is a cross section of the magnetic and non-magnetic layers of the composite metal film structure.

In this invention, alternating layers of magnetic metal conducting films and nonmagnetic metal conducting films are deposited on a supporting substrate. The supporting substrate can comprise materials such as copper, brass, silver, beryllium-copper alloys in sheet form or on a supporting substrate comprising a nonmetallic material such as glass, mica, polyethylene, Mylar (polyethylene terephthalate) epoxy resins (the condensation product of epichlorohydrin-bisphenol A), etc. which are made conducting by the deposition of a metallic conducting film such as copper, gold, silver, tin, etc., or on non-conducting substrates such as glass, mica, polyethylene, Mylar, epoxy resins, etc. The substrate is etched or machined to a predetermined desired geometry and prepared for subsequent deposition by standard cleaning techniques such as, for example, immersion in suitable solvents (e.g., water, acetone, alcohol, detergent solutions, benezene) or vapor decreasing (trichloroethylene, benzene, acetone, etc.).

A magnetic metal film (e.g., cobalt, cobalt-nickel alloy, iron-nickel alloy, iron-nickel-phosphorus alloy, iron-nickel-cobalt alloy, cobalt-phosphorus alloy, cobalt-nickel-phosphorus alloy is deposited on the substrate by standard deposition techniques (e.g., electroplating, chemical plating, vacuum deposition, sputtering). Then a nonmagnetic conducting film (e.g., gold, silver, copper, tin, platinum, rhodium, palladium, etc.) is deposited on the magnetic metal film by any of the standard deposition techniques (electroplating, chemcial plating, vacuum deposition and sputtering).

The steps of depositing alternate layers of magnetic and nonmagnetic conducting films are repeated until the desired total thickness of magnetic material in the composite structure is obtained.

Of the standard techniques referred to previously which may be used in the deposition of metals, electroplating and chemical plating (electroless plating) are the preferred techniques used in the process. The substrates should be free of oils, grease and other surface contaminants, and prior to plating, the surface may be cleaned, as for example, by immersion in a solution of sodium lauryl sulfate or other detergents. The cleaned substrates are then rinsed and subsequently immersed in a plating bath. In the case of cobalt electrodeposition the preferred bath can consist of aqueous solutions of the chloride, sulfate, sulfamate, or citrate, etc., salts of cobalt, or mixtures thereof. In the case of Co-P alloy deposition, the preferred bath consists of these same solutions with the addition of sodium hypophosphite to the solution which acts as the source of P in the electrodeposit. In the case of Co-Ni alloys electrodeposition, the preferred baths can consist of aqueous solutions of the chloride, sulfate, sulfamate, or citrate, etc., salts of cobalt and nickel or mixtures thereof. In the case of Co-Ni-P alloys electrodeposition, the preferred baths consist of these same solutions with the addition of sodium hypophosphite to the solution which acts as the source of phosphorus in the electrodeposit. In the case of Fe-Ni electrodeposition, the preferred baths consist of aqueous solutions of the chloride, sulfate, sulfamate, or citrate, etc., salts of iron and nickel or mixtures thereof. In the case of Fe-Ni-P alloys electrodeposition, the preferred baths consist of these same solutions with the addition of the sodium hypophosphite to the solution which acts as the source of phosphorus in the deposit. In the case of Fe-Ni-Co alloy electrodeposition, the preferred baths consist of aqueous solutions of the chloride, sulfate, sulfamate or citrate, salts of cobalt, nickel and iron, or mixtures thereof.

It is understood that said electroplating solutions contain materials such as buffering agents, as for example boric acid, wetting agents, as for example, sodium lauryl sulfate, and other additives to improve plating as is consistent with standard electroplating techniques.

It is also understood that said plating solutions contain additives such as for example saccharin, thiourea, and potassium thiocyanate as are required to achieve desired magnetic properties of the electrodeposit.

The pH and temperature of the bath are maintained within ranges suitable for the bath chosen.

Agitation of the solution during plating may be desirable and can be accomplished by a mixer, moving work bar, solution circulation, or other suitable means.

The electroplating is accomplished by making the substrate the cathode of the electrolytic cell and providing a soluble anode which can be of the material to be plated or an insoluble anode such as platinum, graphite, stainless steel, etc. A suitable current is passed through the bath between the anode and cathode for a sufficient time to deposit a film of the desired thickness.

After the deposition of the initial magnetic layer is completed, the plated substrate is removed from the plating solution and rinsed in distilled water until adhering plating solution is removed.

The plated substrate is then immersed in a plating solution for the purpose of depositing a thin nonmagnetic conducting film thereon. When gold is to be deposited, this solution consists of an aqueous solution (cyanide complex) of gold in which the cyanide is added as either potassium cyanide or sodium cyanide. Other standard gold plating solutions may be used. If copper is to be deposited, the solution consists of an aqueous bath of copper sulfate, or of copper cyanide. When silver is to be deposited, the bath consists of an aqueous solution of silver cyanide and potassium cyanide. The electroplating is accomplished in the same manner previously described for the electrodeposition of the magnetic film on the conducting substrate.

After the deposition of the nonmagnetic conducting film, the plated substrate is removed from the plating solution and rinsed in distilled water.

The process of plating magnetic and nonmagnetic films is repeated until a predetermined number of layers have been deposited.

In the case of electroless deposition of Co-P alloys, the preferred plating baths consist of aqueous solutions of chloride, sulfate, citrate, or succinate salts of cobalt or mixtures thereof, and of sodium hypophosphite. In the case of electroless deposition of Co-Ni-P alloys, the preferred plating bath consists of an aqueous solution of chloride, sulfate, citrate, or succinate salts of cobalt and nickel, or mixtures thereof, and of sodium hypophosphite. In the case of electroless deposition of Fe-Ni-P alloys, the preferred plating baths consist of aqueous solutions of chloride, sulfate, citrate, or succinate salts of cobalt and nickel, or mixtures thereof, and of sodium hypophosphite.

Plating is accomplished by immersion of the substrate in a sensitizing bath consisting of an aqueous solution of tin chloride ($SnCl_2$) followed by immersion of the substrate in an aqueous solution of palladium chloride ($PdCl_2$) followed by immersion of the substrate in the desired electroless plating bath.

Deposition of the film occurs by catalytic reduction of the metallic constituents of the plating bath by sodium hypophosphite at the plating surface.

Plating is carried out for a sufficient time to deposit a film of the desired thickness.

After the deposition of the initial magnetic layer is completed, the plated substrate is removed from the electroless plating bath, and is rinsed in distilled water. A thin nonmagnetic conducting film is then deposited on the plated substrate in the same matter as previously described for the electrodeposition of nonmagnetic conducting films.

The process of plating magnetic and nonmagnetic films is repeated until a predetermined number of layers have been deposited.

The magnetic metal film layers are uniform in thickness and greater in thickness than the thickness of the nonmagnetic conducting layers. The particular application for which the laminated structure is to be used determines the desired total thickness of magnetic material in the composite laminated structure, and the desired thickness of the individual magnetic layers. For example when used as a memory device element, the range of desired total thickness is from 1000 A. to 30,000 A., and when used as a magnetic recording media the desired total thickness is from .01 mil to 1.0 mil.

The preferred range of thickness of individual nonmagnetic conducting layers is from 50 A. to 200 A. for all applications.

The thickness of the individual magnetic layers is determined by the $H_c$ desired for the total laminated film structure which is determined by the particular application. For example, when used as a memory device element, the range of desired thickness of the individual magnetic layers is from 500 A. to 10,000 A. and consists of soft magnetic material ($H_c$ less than 10 oersteds). When used as a magnetic recording media the range of desired thickness of the individual magnetic layers is from .005 mil to .1 mil and consists of hard magnetic material ($H_c$ greater than 100 oersteds).

When uniaxial magnetic anisotropy is desired as in certain applications of soft magnetic materials for memory devices, uniaxial magnetic anisotropy is attained by plating in the presence of a magnetic field of approximately 50 oersteds.

*Example I*

A copper substrate is cleaned in an aqueous solution of sodium lauryl sulfate and rinsed with distilled water.

(a) Then the substrate is immersed in a plating bath containing the following ingredients:

| | Grams/liter of solution |
|---|---|
| $CoCl_2 \cdot 6H_2O$ | 7.0 |
| $FeCl_2 \cdot 4H_2O$ | 5.0 |
| $NiCl_2 \cdot 6H_2O$ | 200.0 |
| $H_3BO_3$ | 25.0 |
| Sodium lauryl sulfate | 0.4 |
| Saccharin | 0.8 |

The bath is maintained at a pH of 3.0 and the temperature is maintained at 25° C. Agitation of the bath is not required. Electrical connection is made so that the copper substrate is cathodic to a soluble nickel anode in the plating bath. Electrolytic action is obtained by applying a suitable voltage across the anode and cathode to obtain a plating current density at the cathode of 3.0 milliamperes per square centimeter. The plating is carried out at this current density for 30 minutes in order to obtain a Fe-Ni-Co alloy deposit of 10,000 A. thickness. The ratio of nickel to iron in this alloy deposit is approximately 4:1 and the alloy deposit contains cobalt as a minor constitutent which comprises approximately 4% by weight of the total deposit. After completion of this plating step, the plated substrate is withdrawn from the plating bath and rinsed with distilled water.

(b) The copper substrate which has been plated with the Fe-Ni-Co alloy is immersed in a plating bath containing the following ingredients:

| | Grams/liter of solution |
|---|---|
| Au | 1.9 |
| KCN | 15.0 |
| $Na_2HPO_4 \cdot 12H_2O$ | 3.7 |

(The pH is not controlled.)

The bath is maintained at a temperature of 65° C. and is agitated. A gold anode is used and plating is carried out at a cathode current density of 10 ma./cm.$^2$ for 5 seconds to obtain a gold deposit of approximately 100 A. thickness. This deposit is then removed from the plating bath and rinsed with distilled water.

Now steps (a) and (b) are repeated in sequence until a total of four layers of Fe-Ni-Co alloy, each of 10,000 A. thickness, and three layers of gold, each of 100 A. thickness, are obtained as illustrated in FIG. 1. The laminated composite metal film structure thus produced has a coercivity of 1.0 oersted. FIG. 1 shows a cross section of the laminated composite metal film structure which results from the above process comprising alternating layers of Fe-Ni-Co alloy and gold on a copper substrate.

Figure 2:
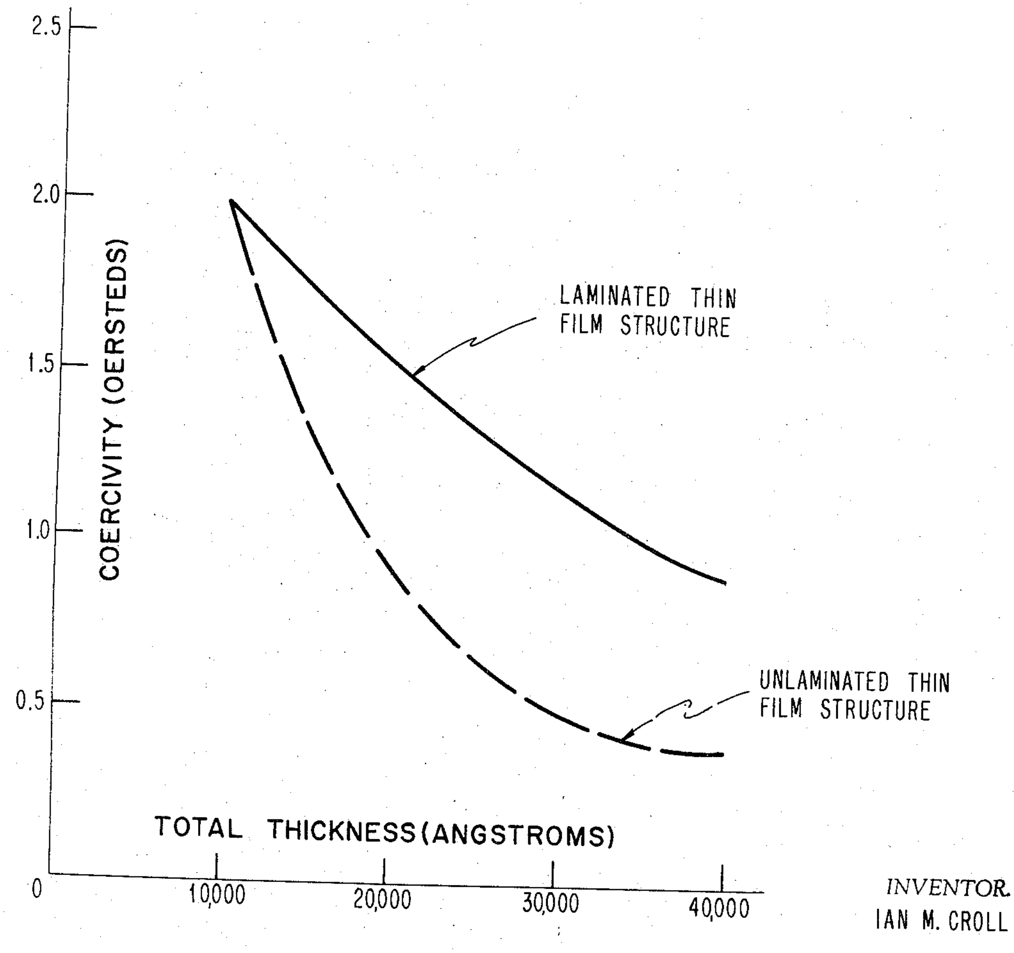
FIG. 2 is a graph showing the relationship between coercive force ($H_c$) and total thickness of magnetic material for a laminated film structure and for an unlaminated film structure.

In FIG. 2, the coercivity of the laminated composite metal film structure is illustrated by the solid line as a function of a total thickness (number of 10,000 A. layers of Fe-Ni-Co alloy). The coercivity of an unlaminated Fe-Ni-Co alloy deposit is shown by the broken line as a function of the total thickness of the unlaminated deposit for comparison. It can be seen from the graph that for the same total thickness of material, the laminated deposit has a higher coercivity than the unlaminated deposit.

The laminated composite metal film structure is used as a magnetic memory element in electronic computer mechanisms.

*Examples II–VI*

The process of Example I is repeated for each of the Examples II–VI except that the plating baths, substrate and the operating conditions set forth in Table I for each example are used. The laminated composite metal film structure produced for each example is set forth as well as the type of material in each layer and the number of layers. Magnetic materials having high coercive force are designated as being hard magnetically ($H_c$ greater than 100 oersteds) and are used as magnetic recording media. Materials having low coercive force are designated as being soft magnetically ($H_c$ less than 10 oersteds) and are used as materials for magnetic memory elements in electronic computer mechanisms.

TABLE I

| Example No. | Substrate (Cathode) | Anode | Ingredients of Plating Bath | Amount (g./l.) | pH | Temp. (° C.) | Current Density ma./cm.[2] | Time | Agitation | Material Deposited | No. of Layers | Type of Magnetic Material |
|---|---|---|---|---|---|---|---|---|---|---|---|---|
| II (a) | Brass | Co | $CoCl_2 \cdot 6H_2O$ | 60.0 | 6.0 | 25 | 400 | 10 min | Yes | Co | 5 | Hard. |
| II (b) | | Sn | $SnBF_4$<br>$HBF_4$<br>$H_3BO_3$<br>$C_{10}H_7OH$<br>Gelatin | 200.0<br>52.0<br>30.0<br>1.0<br>6.0 | [1] NC | 50 | 50 | 5 sec | Yes | Sn | 4 | |
| III (a) | Ag | Co | $CoSO_4 \cdot 7H_2O$<br>$NiCl \cdot 6H_2O$ | 70.0<br>60.0 | 6.0 | 25 | 400 | 5 min | Yes | Co-Ni alloy Co (rich). | 7 | Do. |
| III (b) | | Ag | AgCN<br>KCN<br>$K_2CO_3$ | 36.0<br>60.0<br>45.0 | [1] NC | 45 | 10 | 5 sec | Yes | Ag | 6 | |
| IV (a) | Cu | Ni | $FeCl_2 \cdot 4H_2O$<br>$NiCl_2 \cdot 6H_2O$<br>$H_3BO_3$<br>Sodium lauryl sulfate.<br>Saccharin | 3.5<br>200.0<br>25.0<br>0.4<br>0.8 | 3.0 | 25 | 3 | 15 min | Yes | Fe-Ni alloy (Ni rich) (Ni:Fe ratio= 4:1). | [2] 3 | Soft. |
| IV (b) | | Au | Au<br>KCN<br>$Na_2HPO_4 \cdot 12H_2O$ | 1.9<br>15.0<br>3.7 | [1] NC | 65 | 10 | 5 sec | Yes | Au | [2] 3 | |
| V (a) | Copper coated glass. | Ni | $FeSO_4 \cdot 7H_2O$<br>$NiSo_4 \cdot 6H_2O$<br>$NaH_2PO_2 \cdot H_2O$ | 4.0<br>200.0<br>0.4 | 3.0 | 25 | 10 | 5 min | Yes | Fe-Ni-P alloy (Ni:Fe ratio= 4:1). | 4 | Do. |
| V (b) | | Au | Au<br>KCN<br>$Na_2HPO_4 \cdot 12H_2O$ | 1.9<br>15.0<br>3.7 | [1] NC | 65 | 10 | 5 sec | Yes | Au | 3 | |
| VI (a) | Be-Cu | Co | $CoSo_4 \cdot 7H_2O$<br>$NiCl_2 \cdot 6H_2O$<br>$NaH_2PO_2 \cdot H_2O$<br>$H_3BO_3$ | 150.0<br>140.0<br>2.0<br>25.0 | 4.5 | 40 | 200 | 10 min | Yes | Co-Ni-P alloy (Co rich). | 2 | Hard. |
| VI (b) | | Cu | $CuSO_4 \cdot 5H_2O$<br>$H_2SO_4$ | 26.0<br>5.0 | [1] NC | 65 | 40 | 3 sec | Yes | Cu | 1 | |

[1] pH not controlled.
[2] Gold is plated first on the substrate, then Fe-Ni alloy, then gold and then Fe-Ni alloy and then gold again and then finally Fe-Ni alloy.

*Example VII*

(a) A non-conducting substrate consisting of Mylar (polyethylene terephthalate) is sensitized by immersion for 10 seconds in an aqueous solution of $SnCl_2$ (30 g./l. of solution) and then followed by immersion in an aqueous $PdCl_2$ solution (0.3 g./l. of solution). The sensitized substrate is then immersed in an electroless (chemically) plating bath containing the following ingredients:

| | Grams/liter of solution |
|---|---|
| $CoSo_4 \cdot 7H_2O$ | 34.5 |
| $NH_4Cl$ | 50.0 |
| $NaH_2PO_2 \cdot H_2O$ | 20.0 |
| $Na_3C_6H_5O_7 \cdot 2H_2O$ | 35.0 |

The pH of the bath is maintained at 8.5 and the temperature of the bath is maintained at 80° C. The bath is agitated. The substrate is plated for 45 seconds after which it is removed from the bath and rinsed. The deposit consists of a Co-P alloy with cobalt as the major constituent and having phosphorus as the minor constituent (2% by weight).

(b) The plated Mylar substrate is immersed in an acid copper sulfate plating bath containing:

| | Grams/liter of solution |
|---|---|
| $CuSO_4 \cdot 5H_2O$ | 26.0 |
| $H_2SO_4$ | 5.0 |

The pH is not controlled.
Temperature of bath is 65° C.
Current density is 40 ma./cm.$^2$.
Plating time is 3 seconds.

This deposit is then removed from the plating bath and rinsed with distilled water.

(c) The substrate is then immersed in $PdCl_2$ (0.3 g./l. of solution) prior to immersion again in the electroless cobalt plating bath set forth in 7(a) above and plated for 45 seconds. It is then removed from the bath and rinsed with distilled water.

Now steps (b) and (c) are repeated in sequence until a total of four layers of the Co-P alloy and three layers of copper have been deposited, thus forming a laminated structure of alternating layers of Co-P alloy and copper. The hard magnetic laminated composite metal film structure thus prepared is useful as a magnetic recording medium.

Thus, the present invention has described a method of increasing the output of magnetic metal film devices in such a manner that the coercivity of the laminated films is greater than that for an unlaminated film of the same total thickness and of the same magnetic material. Therefore, an increase in the total thickness of magnetic material is obtained while still maintaining resistance to disturbing magnetic fields, thereby increasing the amount of magnetic flux available to produce signal output.

While the invention has been particularly shown and described with reference to preferred embodiments thereof, it will be understood by those skilled in the art that various changes in form and details may be made therein without departing from the spirit and scope of the invention.

I claim:

1. A laminated magnetic film device having a total magnetic film thickness of from 10,000 A. to 40,000 A., said device having a coercivity greater than the coercivity of an unlaminated magnetic film device of equal thickness comprising a plurality of discrete laminae of a magnetic material having uniform thicknesses, said magnetic material being selected from the group consisting of Fe-Ni alloy, Fe-Ni-Co alloy, and Fe-Ni-P alloy; and a series of discrete nonmagnetic conducting metal laminae selected from the group consisting of Au, Ag, Cu, Sn, Rh, Pd and Pt, alternately disposed between said magnetic laminae, each of said nonmagnetic conducting laminae having uniform thickness of from 50 A. to 200 A.

2. The device of claim 1 wherein each of the magnetic laminae has a uniform thickness of from about 500 A. to 10,000 A. and each of the nonmagnetic conductive laminae has a uniform thickness of from about 50 A. to 200 A.

3. The device of claim 2 wherein each of the magnetic laminae is 10,000 A. thick.

4. The device of claim 3 wherein each of the nonmagnetic conducting metal laminae is Au having a thickness of 100 A.

5. The device of claim 4 wherein said device has a coercivity of from 1.0 to 2.0 oersteds.

References Cited

UNITED STATES PATENTS

| | | | |
|---|---|---|---|
| 2,011,698 | 8/1935 | Vogt | 175—21 |
| 2,221,983 | 11/1940 | Mayer et al. | 175—21 |
| 2,802,187 | 8/1957 | Evans et al. | 336—200 |
| 2,923,642 | 2/1960 | Hausen | 117—68 |
| 3,096,206 | 7/1963 | Wade | 117—121 |
| 3,119,753 | 1/1964 | Mathias et al. | 204—43 |
| 3,124,428 | 3/1964 | Rabinowicz | 29—199 |
| 3,131,078 | 8/1964 | Fuller et al. | 117—8 |
| 3,183,492 | 5/1965 | Chow et al. | 340—174 |
| 3,201,863 | 8/1965 | Sayre | 29—472.3 |
| 3,219,353 | 11/1965 | Prentky | 274—41.4 |
| 3,269,854 | 8/1966 | Hei | 117—47 |

OTHER REFERENCES

Blois, Jr., M. S.: "Preparation of Thin Magnetic Films and Their Properties," 26, J. Appl. Phys. 8, pp. 975–980, QC1J 82.

Williams, H. J. and Sherwood, R. C.: "Magnetic Domain Patterns on Thin Films," 28, J. Appl. Phys., 5, pp. 548–555, QC1J 82.

WILLIAM D. MARTIN, *Primary Examiner.*

W. D. HERRICK, *Assistant Examiner.*